United States Patent
Swackhamer et al.

(10) Patent No.: US 6,484,905 B1
(45) Date of Patent: Nov. 26, 2002

(54) POWDER DISPENSER

(76) Inventors: William Swackhamer, 369 Catamaran St., Foster City, CA (US) 94404; Patricia Swackhamer, 369 Catamaran St., Foster City, CA (US) 94404

(*) Notice: Subject to any disclaimer, the term of this patent is extended or adjusted under 35 U.S.C. 154(b) by 0 days.

(21) Appl. No.: 09/814,361

(22) Filed: Mar. 21, 2001

(51) Int. Cl.$^7$ ............................................... B67C 11/00
(52) U.S. Cl. ......................... 222/158; 222/461; 222/568
(58) Field of Search ................................ 222/158, 568, 222/461

(56) References Cited

U.S. PATENT DOCUMENTS

| | | | | |
|---|---|---|---|---|
| 3,348,716 A | * | 10/1967 | Nakata ......................... 222/461 |
| D317,261 S | | 6/1991 | Brown et al. ................. D9/430 |
| 5,275,298 A | | 1/1994 | Holley, Jr. et al. .......... 215/11.4 |
| 5,419,445 A | | 5/1995 | Kaesemeyer ................ 215/11.1 |
| D365,246 S | | 12/1995 | Staffin et al. ................. D7/376 |
| 5,570,816 A | | 11/1996 | LaBarbera, Jr. ........... 222/129.4 |
| D376,734 S | | 12/1996 | Petrie ........................... D7/629 |
| D380,271 S | | 6/1997 | Reinbolt ...................... D24/197 |
| 5,638,968 A | | 6/1997 | Baron et al. ................ 215/11.4 |
| 5,653,353 A | | 8/1997 | Otto et al. .................... 215/306 |
| 5,662,249 A | * | 9/1997 | Grosse ......................... 222/461 |
| 5,667,109 A | | 9/1997 | Yu-Mei ........................ 222/456 |
| 5,671,325 A | | 9/1997 | Roberson ..................... 392/442 |
| D390,964 S | | 2/1998 | Mercer et al. .............. D24/197 |
| 5,772,086 A | | 6/1998 | Krafft .......................... 222/438 |
| D406,648 S | | 3/1999 | Frazier ........................ D24/197 |
| 5,944,230 A | | 8/1999 | Chiang ........................ 222/158 |
| 5,960,971 A | | 10/1999 | Bral ............................ 215/11.4 |
| 6,045,254 A | | 4/2000 | Inbar et al. .................. 366/130 |
| 6,118,933 A | | 9/2000 | Roberson ..................... 392/442 |
| 6,189,742 B1 | | 2/2001 | Thomson et al. ........... 222/339 |

* cited by examiner

*Primary Examiner*—Philippe Derakshani
(74) *Attorney, Agent, or Firm*—Haverstock & Owens LLP

(57) ABSTRACT

A powder dispensing system is disclosed which is formed from a top dispenser portion coupled to bottom container portion. The top dispenser portion has a dispenser orifice with a cap that is preferably attached to the dispenser through strap element. The top dispenser portion and the bottom container portion are coupled through geometrically matched brim sections with snap features or complementary twisting threads that adjoin the top and the bottom to form a smooth interior dispensing surface. The smooth interior dispensing surface is angled less than 90 degrees relative to the inverted dispensing direction such that a powder is capable of being fully dispensed by inverting the dispenser and without significant collection or retention of the powder on interior surfaces. Preferably, the bottom container portion is substantially cylindrical, transparent and has graduated marks so that the quantity of powder within the dispenser is readily discerned. The interior wall of the dispenser top is preferably gradient with a gradient angle between 30 and 60 degrees so that the powder is funneled to the dispenser orifice with the dispenser in an inverted position. The dispenser is particularly useful for dispensing powdered milk and the orifice is preferably sized to fit into a baby bottle compartment.

17 Claims, 5 Drawing Sheets

POWDER DISPENSER

FIELD OF THE INVENTION

The present invention relates to dispensers. More particularly, the present invention relates to powder dispensers.

BACKGROUND OF THE INVENTION

One of the difficulties with dispensing powder is that the powder being dispensed tends to get caught in the creases, cracks or grooves on the interior surfaces of the dispenser. Also, to powder often collects on the interior surface of the dispenser resulting in incomplete dispensing of the powder. Problems with dispensing powder using conventionally know dispensers is exasperated when the powder is extremely fine, such as in the case of powdered milk or baby formula. As is known, baby formula is sold in a multi-serving container with a dispensing Scoop. Unfortunately, the multi-serving containers are considered too large to conveniently carry around.

FIG. 1A shows a perspective view of a prior art powdered milk dispenser 100 with a plurality of dispensing compartments. The prior art powdered milk dispenser 100 has a body section 101 and a top section 107. The top section 107 is configured with a spout 104 and a cap 111. Typically, the art powdered milk dispenser 100 has three compartments 102, 103 and 105, with the third compartment 102 being adjacent to compartments 103 and 105. The compartments 102, 103 and 105 are separated by walls 122, 123 and 125. In use, the spout 104 is aligned over one of the compartments 102, 103 or 105 containing powdered milk. After the spout 104 is aligned over one of the compartments 102, 103 or 105, then the dispenser 100 is placed in an inverted dispensing direction 117 with the cap 111 off of the spout 104 and with the spout 104 over a mouth portion 115 of a baby bottle, as shown in FIG. 1B.

FIG. 1B shows a cross-sectional view of the powdered milk dispenser 100 inverted and dispensing powdered milk. Because the interior surfaces of the cap portion 107 are at an angle θ that is approximately 90 degrees relative to the inverted dispensing direction 117, a significant amount of powder residue 114 powder is collected and retained on the interior surfaces of the cap 107. Generally, even knocking the dispenser fails to completely remove all residue 114. This can be problematic, especially for powdered milk, since retention of the powdered milk in humid or moist conditions can lead to spoilage and bacteria formation. Thus, the powdered milk dispenser 100 needs to be thoroughly washed after each use to remove the retained portions of the powdered milk. Because of the numerous compartments and surfaces of the powdered milk dispenser 100, cleaning is laborious. Further, because the width W of the body 101 is wider than a standard baby bottle, the dispenser 100 can not be stored in compartments of a tote-bag or other storage compartments that are designed or sized to hold baby bottles. Yet a further shortcoming of the prior powdered milk dispenser 100, is that the user must properly gauge the rotation of the top section 107 such that the spout 104 is directly over the appropriate compartment 102, 103 or 105. In the event that the spout 104 is positioned between any two of the compartments 102, 103 or 105, inaccurate or incomplete dispensing of the powdered will result.

SUMMARY OF THE INVENTION

The current invention is for an improved powder dispensing system. The system has a dispenser body with a dispenser orifice through which powder is dispensed. The dispenser preferably has a cap that removably covers the dispenser orifice by snugly fitting around a lip section of the orifice and is attached to the dispenser body through strap element.

The dispenser orifice is preferably round and between 1 and 3 cm in diameter, such that the lip section of the dispenser orifice fits into a top portion of a baby bottle. The interior surfaces of the dispenser body are smooth and are angled less than 90 degrees relative to the inverted dispensing direction such that a powder is capable of being fully dispensed by inverting the dispenser and without significant collection or retention of the powder on interior surfaces of the dispenser.

Preferably, the dispenser body is formed from a top portion and a bottom portion. The top portion has the dispenser orifice and a top brim section with a predetermined geometry. Preferably, the predetermined geometry of the top brim section is round. Alternatively, the geometry is square or any other suitable geometry. The bottom portion has a bottom brim section that is geometrically matched with the top brim section, whereby the top brim section and the bottom brim section are capable of being detachably coupled to each other to form a dispenser body with smooth interior dispensing surfaces.

The top brim and the bottom brim section are detachably coupled with pressure snap features, wherein one of the top or the bottom brim fits over the other brim and snaps securely into position. Alternatively, the top brim and the bottom brim are configured with complimentary twist threads and the top portion and the bottom portion of the dispenser are detachably coupled by aligning the top brim section to the bottom brim section and twisting the top and the bottom portions in opposite directions relative to each other.

In the most preferred embodiment of the invention, the dispenser is formed from a plastic or polymer material and the bottom portion is sufficiently transparent such that the quantity of powder within the dispenser is visible. The bottom portion is also preferably cylindrical and the top portion is preferably funnel-shaped. Further, the dispenser is preferably in the range of 5–15 cm tall and 3–7 cm wide. In the most preferred embodiment of the invention the powder dispenser is configured to hold 1 to 4 serving of powdered milk, equaling approximately 2 to 8 ounces of liquid formula, and has dimensions such that the dispenser can be readily stored within a compartment sized to hold a baby bottle. Also, the bottom section preferably has graduated marks to indicate the amount of powder that is dispensed.

BRIEF DESCRIPTION OF THE DRAWINGS

FIG. 1B shows a cross-sectional view of the powdered milk dispenser shown in FIG. 1A inverted and dispensing powdered milk.

DETAILED DESCRIPTION OF THE INVENTION

Figure 1A:
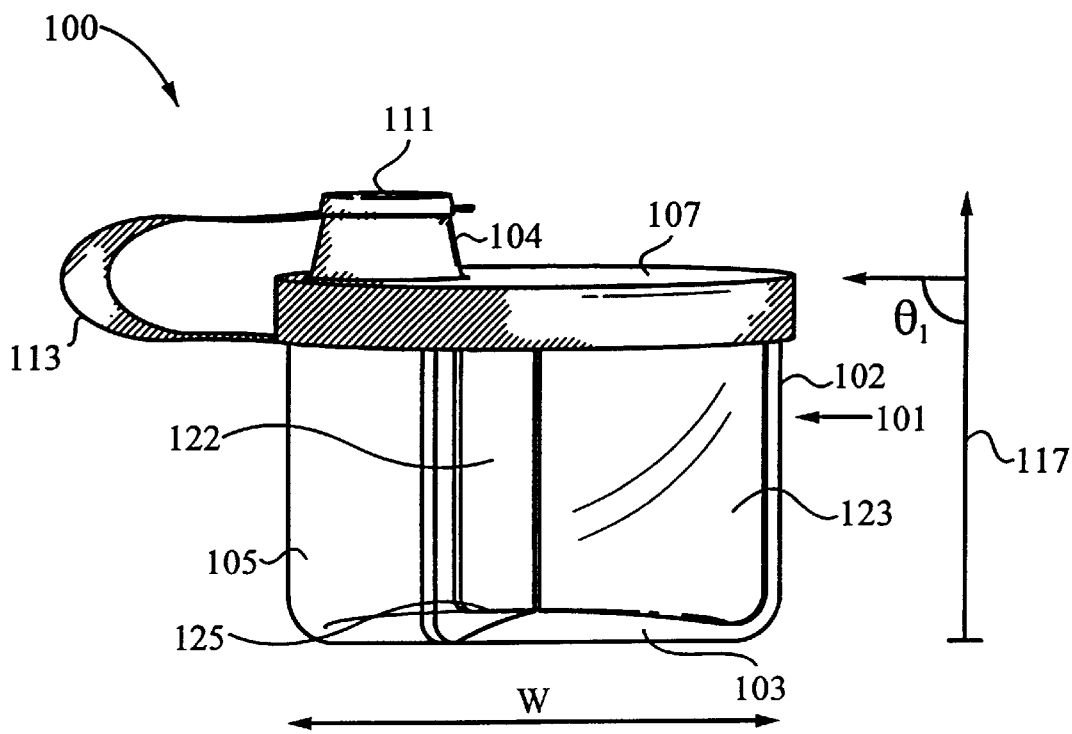
FIGS. 1A–B show a prior art powdered milk dispenser.
Figure 1B:
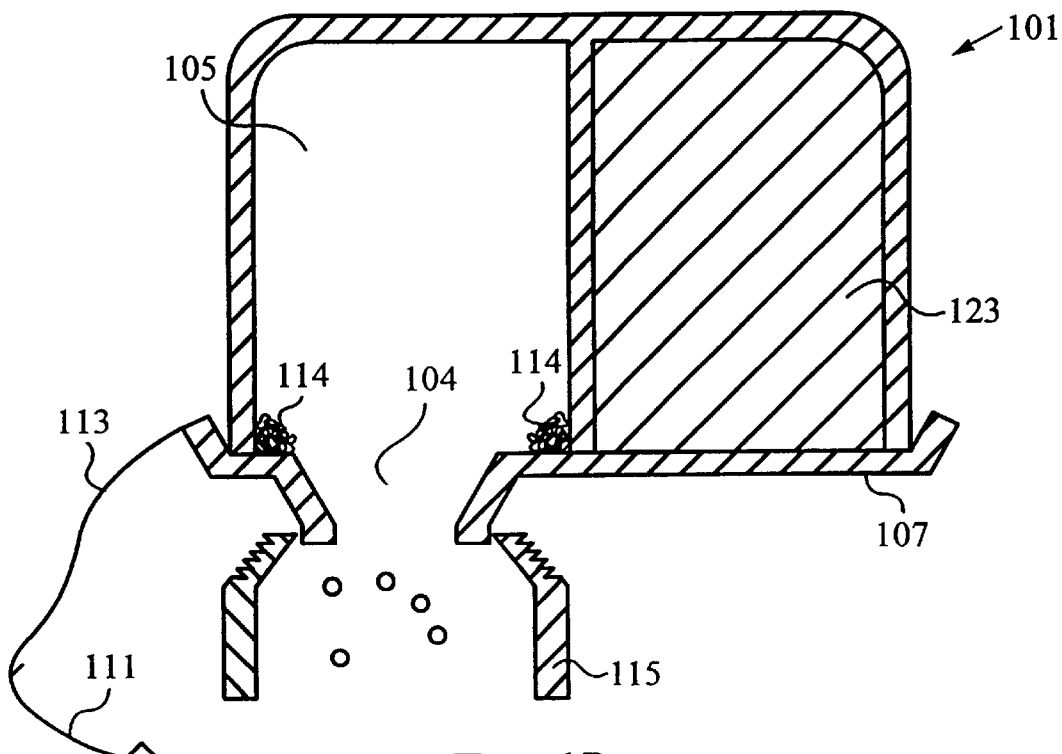
Figure 2:
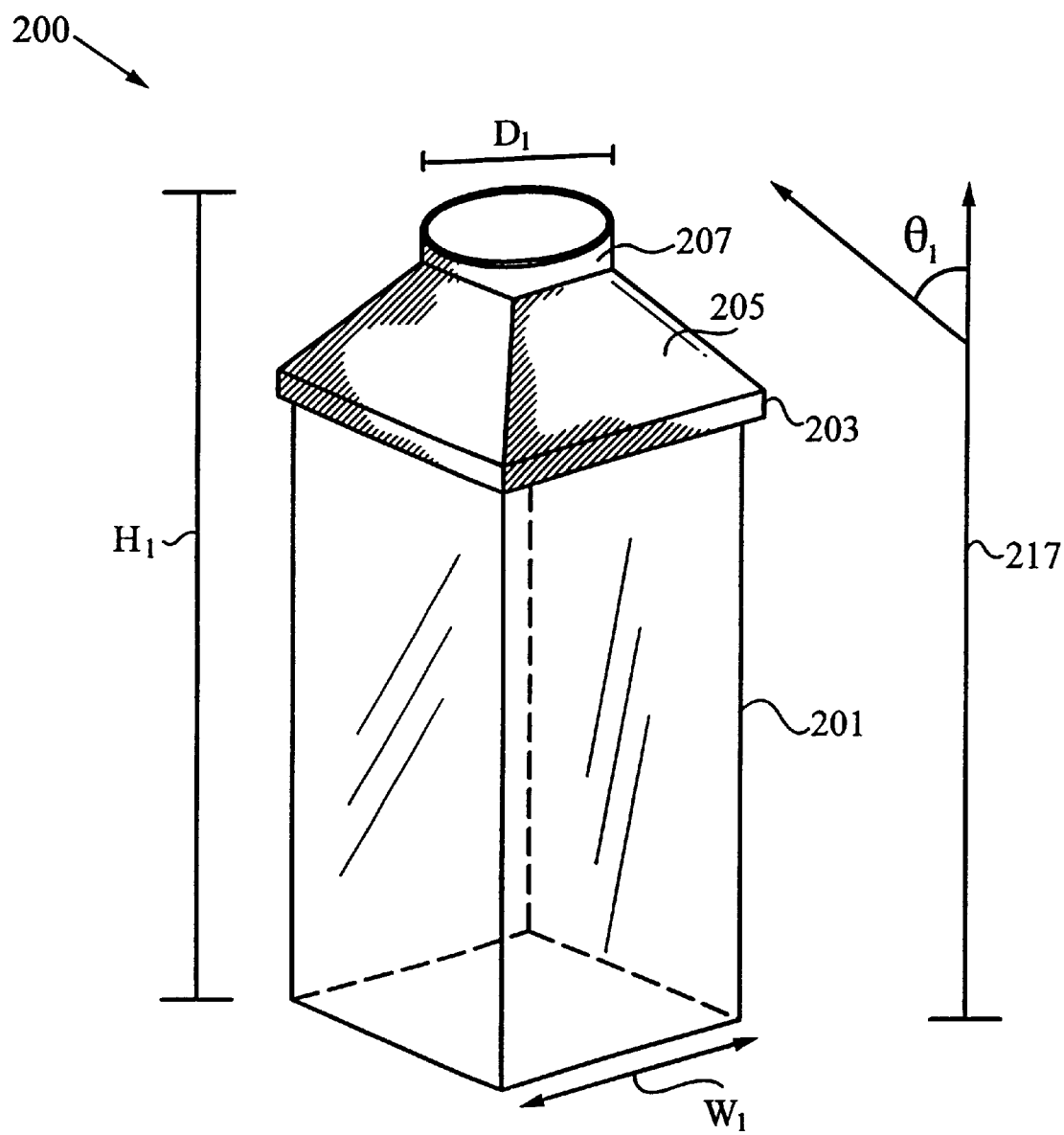
FIG. 2 shows a perspective view of a powder dispenser in accordance with the instant invention.

The present invention seeks to solve the numerous short comings of prior art powdered milk dispensers. FIG. 2 shows a powder dispenser 200, in accordance with the current invention. The dispenser 200 has a dispenser top 205 with a dispenser orifice 207 and a top brim 203. The dispenser orifice 207 is preferably substantially circular and preferably has diameter $D_1$ in the range of 1–3 cm, sufficiently small to fit within the opening of a standard baby bottle.

The interior top wall leading from the top brim 203 to the orifice 207 is smooth and gradient with an angle $\theta_1$ that is less than 90 degrees relative to the inverted dispensing direction 217. Preferably, the interior wall of the top 205 is gradient with an angle $\theta_1$ that is between 60 and 30 degrees relative to the inverted dispensing direction 217, such that powder is readily funneled to the orifice 207 while dispensing and there is no significant collection of powder on the interior surfaces of the top 205.

The dispenser 200 has a container bottom 201 with a bottom brim (not shown). The bottom brim is preferably geometrically matched with the top brim 203. A top 205 and the bottom 201 are detachable coupled together through the top brim and the bottom brim, such that interior top wall and the interior bottom wall form a smooth dispensing surface, described in detail below.

According to an embodiment of the instant invention the top 205 and the bottom 201 are coupled together through a two part snap features, wherein one portion of the snap feature is on top brim 203 and a second portion of the snap feature on the brim of the bottom 201. Accordingly, the top brim 203 and the brim of the bottom 201 are aligned and "pressure snapped" in to place to form the dispenser 200.

The height $H_1$ of the dispenser 200 is preferably between 5 to 15 cm with a width $W_1$ that is preferably between 3 to 7 cm. Most preferably, the powder dispenser 200 is configured to fit into a baby bottle compartment.

The top 205 and the bottom 201 of the dispenser are preferably formed from a plastic, a thermoplastic or other polymeric materials and can be made to have any number of colors and shapes. The container bottom 201 is preferably sufficiently transparent or translucent such that the amount of powder within the dispenser is visible.

Figure 3:
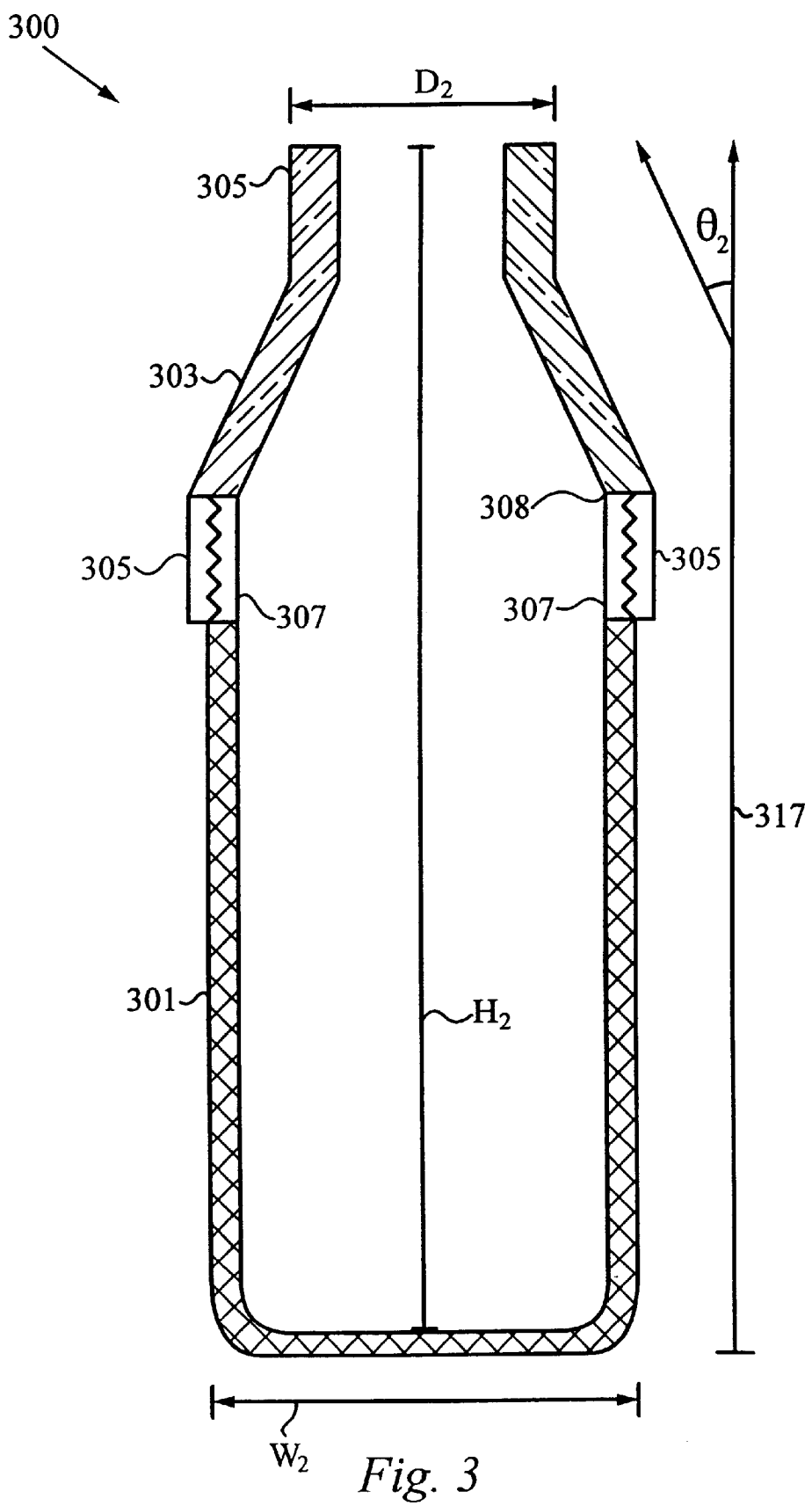
FIG. 3 shows a cross-section of a powder dispenser in accordance with the instant invention.

FIG. 3 illustrates a cross-section of a powder dispenser in accordance with the instant invention. The powder dispenser 300 has a dispenser top 303 and a bottom container 301. The dispenser top 303 has an orifice portion with a lip 305. The diameter $D_2$ of the orifice is between 1 cm and 3 cm. Preferably, the lip 305 is sufficiently small such that lip 305 can easily fit into the orifice of standard baby bottle (not shown). The top 303 and the bottom 301 have geometrically matched brims 305 and 307, respectively. Most preferably, the bottom 301 is substantially circularly cylindrical and the top 303 is circularly funnel-shaped with a gradient interior wall with a gradient angle $\theta_2$ that is between 30 and 60 degrees relative to the inverted dispensing direction 317. Preferably, the brims 305 and 307 are circular and have widths $W_2$ in the range of 3 to 7 cm. Preferably the opening formed by the brim 307 is sufficiently large to allow the bottom 301 to be filled with powdered milk using a standard scoop or spoon. The height $H_2$ of the dispenser 300 is preferably in the range of 5 to 15 cm. It will appear that other shapes and sizes are possible according to the teaching of this invention.

The top brim 305 and the bottom brim 307 are detachably coupled together to form the body of the dispenser 300. Preferably, the top brim 305 and the bottom brim 307 are detachable coupled through twist threads. Accordingly, the top brim 305 and the bottom brim 307 have complementary twist threads, wherein the top 303 and the bottom 301 are adjoined by aligning the complementary twist threads on the bottom brim 307 with the top brim 305 and turning the top 303 and the bottom 301 in appropriate opposite directions relative to each other.

In accordance with the invention, the interior surface region 308 of the dispenser 300 where the top 303 and the bottom 301 meet, is configured to be smooth and substantially seamless such that powder will easily dispense from the dispenser 300 without significant collection or retention of the powder in the region 308, interior walls or elsewhere.

Figure 4:
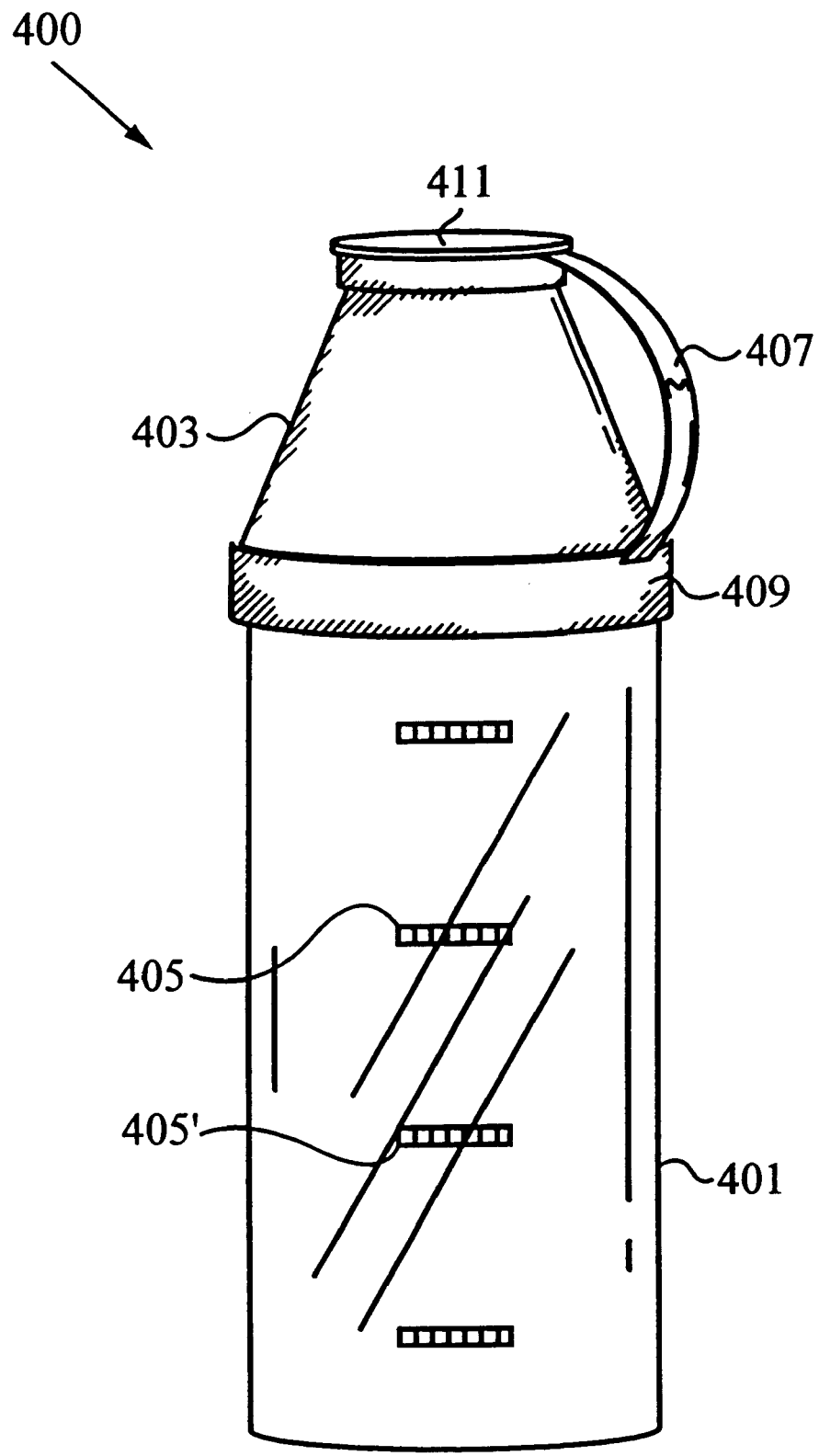
FIG. 4 shows a perspective view of a powder dispenser in accordance with the preferred embodiment of the instant invention.

Now referring to FIG. 4, the dispenser 400 is preferably equipped with a cap 411 that fits over the orifice lip and cover the orifice during storage. The cap is preferably coupled to the top 403 through an integral strap element 407. The bottom 401 of the dispenser 400 is transparent and provided with graduated marks 405 and 405' that allows the user to discern the quantity of powder within the dispenser 400. The top 403 and the bottom 401 are detachably coupled together through snap features or through thread features as described in detail above.

Figure 5:
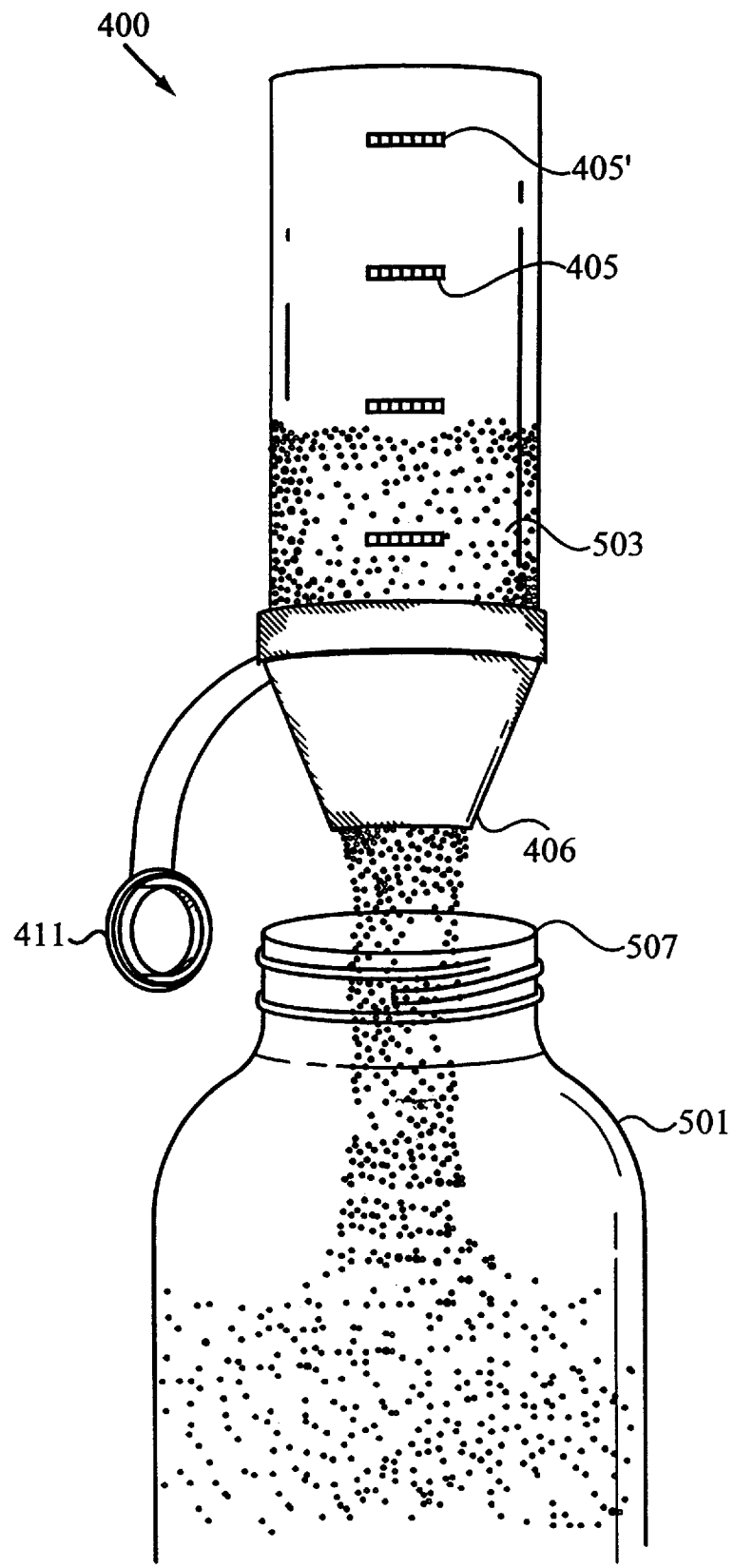
FIG. 5 shows the powder dispenser of the instant invention dispensing powdered milk into a baby bottle.

Now referring to FIG. 5, in use the dispenser 400 containing powdered milk 503 is inverted with the cap 411 removed and with the dispenser orifice 406 over the mouth 507 of a bottle 501. When the desired amount of powdered milk is dispensed into the bottle 501, as discerned through the graduated marks 405 and 405', the dispenser is inverted to the upright position shown in FIG. 4.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiment chosen for illustration without departing from spirit and scope of the invention.

What is claimed is:

1. A powder dispenser comprising:
    a. a dispenser top with a dispenser orifice, a top brim having a predetermined geometry and an interior top wall, the orifice being smaller than the top brim and the interior top wall leading to the dispenser orifice being smooth and gradient relative to an inverted dispensing direction; and
    b. a container bottom with a bottom brim having predetermined geometry that is substantially similar to the top brim and an interior bottom wall,
    whereby the dispenser top and the container bottom are configured to couple together through the top brim and the bottom brim, such that interior top wall and the interior bottom wall form a smooth dispensing surface.

2. The powder dispenser of claim 1, wherein the container bottom has graduated marks corresponding to predetermined volumes.

3. The powder dispenser of claim 1, further comprising a cap for covering the dispenser orifice during storage.

4. The powder dispenser of claim 3, wherein the cap is coupled to the dispenser top through a strap element.

5. The powder dispenser of claim 1, wherein the predetermined geometry of the top brim and the bottom brim is substantially circular.

6. The powder dispenser of claim 5, wherein the top brim and the bottom brim are configured with twist treads such that the dispenser top and the container bottom are capable of being coupled together by aligning the top brim and bottom brim and twisting the dispenser top and the container bottom in opposite directions.

7. The powder dispenser of claim 1, wherein the interior wall of the bottom container section is substantially cylindrical and parallel to the dispensing direction.

8. The powder dispenser of claim 1, wherein the dispenser is 5 to 15 cm long in the dispensing direction.

9. The powder dispenser of claim 1, wherein the dispenser orifice is substantially circular with a diameter between 1 cm and 3 cm.

10. The powder dispenser of claim 1, wherein the dispenser has a maximum width W that is in the range if 3 to 7 cm.

11. The powder dispenser of claim 1, wherein all portions of the smooth dispensing surface are less than 90 degrees relative to the inverted dispensing direction.

12. The powder dispenser of claim 1, wherein the top interior surface is gradient with an angle between 30 and 60 degrees relative to the inverted dispensing direction.

13. A powder dispensing system comprising a body with a circular dispenser orifice between 1 and 3 cm and an interior dispensing surface that is smooth and gradient with angles less than 90 degrees relative to the inverted dispensing direction wherein the interior dispensing surface is formed from a top portion and a bottom portion, the top portion having a top brim and the circular dispenser orifice and the bottom portion having a bottom brim, wherein the top portion and the bottom portion are capable of being detachably coupled through a top brim and the bottom brim.

14. The powder dispensing system of claim 13, wherein the top brim and the bottom brim are substantially circular.

15. The powder dispenser system of claim 13, where the bottom portion is substantially cylindrical.

16. The powder dispensing system of claim 13, further comprising a cap configured to cover the dispenser orifice.

17. The powder dispensing system of claim 16, further comprising a strap coupled to the body and the cap.

* * * * *

UNITED STATES PATENT AND TRADEMARK OFFICE
CERTIFICATE OF CORRECTION

PATENT NO.    : 6,484,905 B1                                              Page 1 of 1
DATED         : November 26, 2002
INVENTOR(S)   : William Swackhamer et al.

It is certified that error appears in the above-identified patent and that said Letters Patent is hereby corrected as shown below:

<u>Title page,</u>
Item [56], References Cited, insert -- OTHER PUBLICATIONS
BabyCenter Inc., website - http://babycenter.com/ --.

Signed and Sealed this

First Day of April, 2003

JAMES E. ROGAN
*Director of the United States Patent and Trademark Office*